United States Patent
Wada

(10) Patent No.: US 11,993,372 B2
(45) Date of Patent: May 28, 2024

(54) MORPHING WING, FLIGHT CONTROL DEVICE, FLIGHT CONTROL METHOD, AND STORAGE MEDIUM

(71) Applicant: Japan Aerospace Exploration Agency, Tokyo (JP)

(72) Inventor: Daichi Wada, Chofu (JP)

(73) Assignee: JAPAN AEROSPACE EXPLORATION AGENCY (JP)

(*) Notice: Subject to any disclaimer, the term of this patent is extended or adjusted under 35 U.S.C. 154(b) by 199 days.

(21) Appl. No.: 17/637,252

(22) PCT Filed: Jul. 20, 2020

(86) PCT No.: PCT/JP2020/028169
§ 371 (c)(1),
(2) Date: Feb. 22, 2022

(87) PCT Pub. No.: WO2021/039209
PCT Pub. Date: Mar. 4, 2021

(65) Prior Publication Data
US 2022/0281585 A1     Sep. 8, 2022

(30) Foreign Application Priority Data
Aug. 27, 2019   (JP) .................................. 2019-154809

(51) Int. Cl.
*B64C 3/54* (2006.01)
*B64C 9/02* (2006.01)
(Continued)

(52) U.S. Cl.
CPC ............ *B64C 3/546* (2013.01); *B64C 9/02* (2013.01); *B64C 9/04* (2013.01); *B64C 9/06* (2013.01); *B64C 2003/543* (2013.01)

(58) Field of Classification Search
CPC ............................. B64C 3/546; B64C 33/02
See application file for complete search history.

(56) References Cited

U.S. PATENT DOCUMENTS

| | | | |
|---|---|---|---|
| 2002/0130218 A1 | 9/2002 | Smith | 244/72 |
| 2006/0060698 A1 | 3/2006 | Ohta et al. | 244/72 |
| 2016/0176502 A1* | 6/2016 | Snook | B64C 3/546 |
| | | | 244/218 |

FOREIGN PATENT DOCUMENTS

| | | |
|---|---|---|
| CN | 102107733 A | 6/2011 |
| CN | 107499498 A | 12/2017 |

(Continued)

OTHER PUBLICATIONS

International Search Report dated Sep. 29, 2020 in corresponding PCT International Application No. PCT/JP2020/028169.
(Continued)

*Primary Examiner* — Timothy D Collins
*Assistant Examiner* — Justin Michael Heston
(74) *Attorney, Agent, or Firm* — OSTROLENK FABER LLP

(57) ABSTRACT

A morphing wing includes a pantograph mechanism capable of being extended and contracted in a predetermined direction, a plurality of flight feathers attached to the pantograph mechanism, connection members configured to connect flight feathers adjacent to each other among the plurality of flight feathers, a first rotating mechanism configured to rotate the pantograph mechanism around one axis of a plane that intersects the direction, and a second rotating mechanism configured to rotate the pantograph mechanism around another axis of the plane. Each of the plurality of flight feathers is configured so that an angle formed by adjacent flight feathers connected via the connection members increases as the pantograph mechanism extends.

8 Claims, 13 Drawing Sheets

(51) Int. Cl.
*B64C 9/04* (2006.01)
*B64C 9/06* (2006.01)

(56) References Cited

FOREIGN PATENT DOCUMENTS

| | | | | |
|---|---|---|---|---|
| CN | 108945431 A | * | 12/2018 | ............ B64C 33/02 |
| CN | 109436319 A | | 3/2019 | |
| CN | 109760833 A | | 5/2019 | |
| JP | 2006-282170 A | | 10/2006 | |
| JP | 2006282170 A | * | 10/2006 | |
| JP | 2006-312436 A | | 11/2006 | |

OTHER PUBLICATIONS

Written Opinion dated Sep. 29, 2020 in corresponding PCT International Application No. PCT/JP2020/028169.
Colin Greatwood et al., "Perched landing manoeuvres with a variable sweep wing UAV," Aerospace Science and Technology, vol. 71, pp. 510-520 (2017).
M. Di Luca et al., "Bioinspired morphing wings for extended flight envelope and roll control of small drones, "Interface Focus, vol. 7, Issue 1, 11 pages (2017).
Antony Waldock et al., "Learning to Perform a Perched Landing on the Ground Using Deep Reinforcement Learning," Journal of Intelligent & Robotic Systems, vol. 92, Issue 3-4, pp. 685-704 (2017).
Office Action dated Dec. 20, 2022, issued in corresponding Japanese Patent Application No. 2019-154809.

* cited by examiner

MORPHING WING, FLIGHT CONTROL DEVICE, FLIGHT CONTROL METHOD, AND STORAGE MEDIUM

CROSS-REFERENCE TO RELATED APPLICATIONS

The present application is a 35 U.S.C. §§ 371 national phase conversion of PCT/JP2020/028169, filed Jul. 20, 2020, which claims priority to Japanese Patent Application No. 2019-154809, filed Aug. 27, 2019, the contents of which are incorporated herein by reference. The PCT International Application was published in the Japanese language.

TECHNICAL FIELD

The present invention relates to a morphing wing, a flight control device, a flight control method, and a program.

BACKGROUND ART

In recent years, research has been conducted on aircrafts with a morphing mechanism on wings. A biomimetic approach that focuses on the musculoskeletal structure of birds in particular and significantly changes a shape and/or a position of a main wing itself and a wing area is expected to dramatically improve or expand the flight performance of an unmanned aircraft. In relation to this, morphing wings that significantly change the area, shape, and position of the wing to innovatively improve or expand flight performance are known (see, for example, Non-Patent Literature 1 to 3).

CITATION LIST

Non-Patent Literature

Non-Patent Literature 1

Colin Greatwood, Antony Waldock, and Thomas Richardson, "Perched landing manoeuvres with a variable sweep wing UAV," Aerospace Science and Technology, Volume 71, December 2017, Pages 510-520: doi: 10.1016/J.AST.2017.09.034.

Non-Patent Literature 2

M. Di Luca, S. Mintchev, G. Heitz, F. Noca, and D. Floreano, "Bioinspired morphing wings for extended flight envelope and roll control of small drones," Interface focus, 6 Feb. 2017, Volume 7, Issue 1: doi: 10.1098/rsfs.2016.0092.

Non-Patent Literature 3

Antony Waldock, Cohn Greatwood, Francis Salama, and Thomas Richardson. "Learning to Perform a Perched Landing on the Ground Using Deep Reinforcement Learning," Journal of Intelligent & Robotic Systems, December 2018, Volume 92, Issue 3-4, pp 685-704: doi:10.1007/S10846-017-0696-1.

SUMMARY OF INVENTION

Technical Problem

However, in conventional technology, flight performance has not been sufficiently improved.

An aspect of the present invention provides a morphing wing, a flight control device, a flight control method, and a program capable of improving the flight performance of an aircraft.

Solution to Problem

According to an aspect of the present invention, there is provided a morphing wing including: a pantograph mechanism capable of being extended and contracted in a predetermined direction; a plurality of flight feathers attached to the pantograph mechanism; connection members configured to connect flight feathers adjacent to each other among the plurality of flight feathers; a first rotating mechanism configured to rotate the pantograph mechanism around one axis of a plane that intersects the direction; and a second rotating mechanism configured to rotate the pantograph mechanism around another axis of the plane, wherein each of the plurality of flight feathers is configured so that an angle formed by adjacent flight feathers connected via the connection members increases as the pantograph mechanism extends.

Advantageous Effects of Invention

According to the aspect of the present invention, it is possible to improve the flight performance of an aircraft.

DESCRIPTION OF EMBODIMENTS

Hereinafter, embodiments of a morphing wing, a flight control device, a flight control method, and a program of the present invention will be described with reference to the drawings.

First Embodiment

Figure 1:
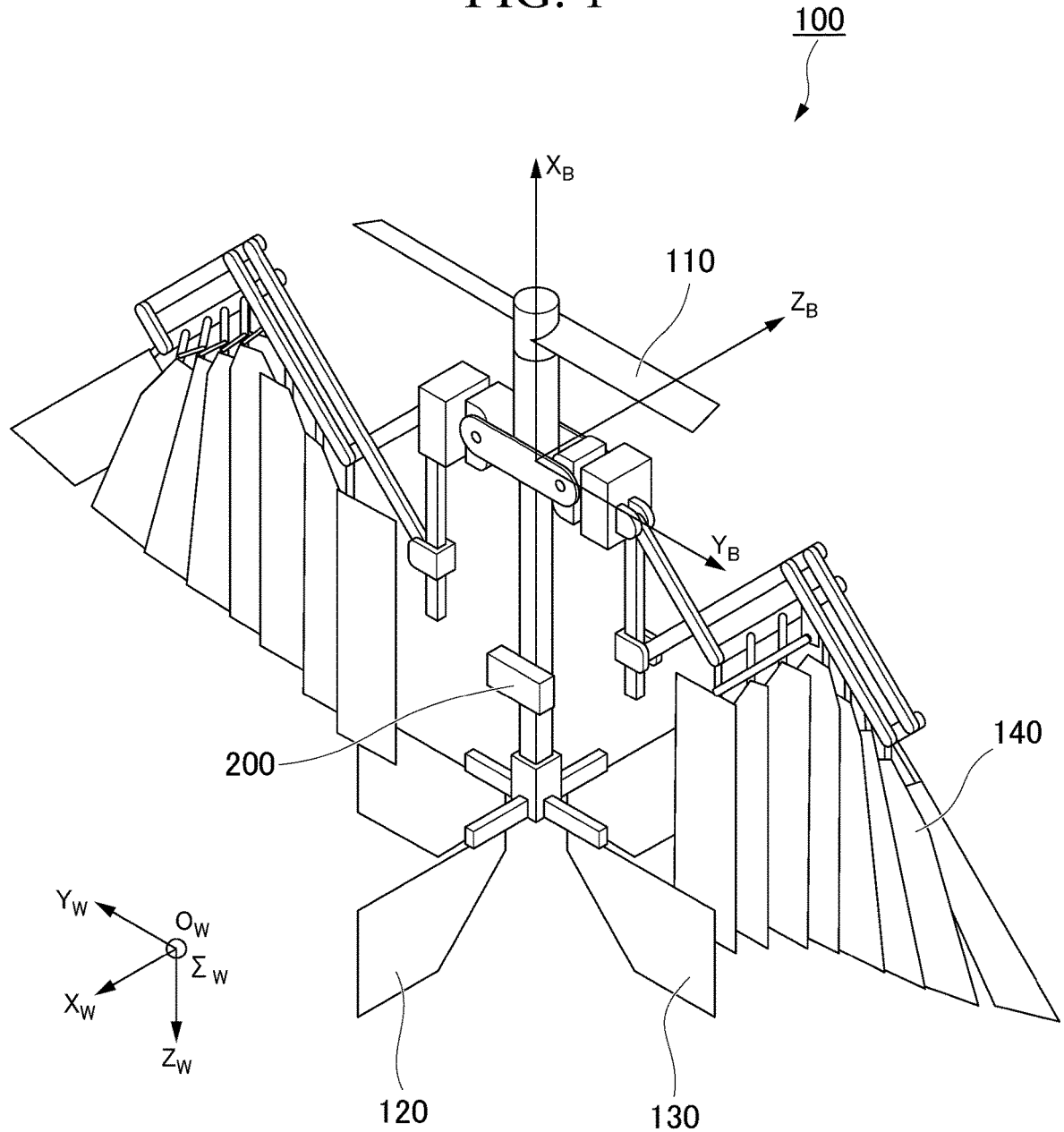
FIG. 1 is a diagram showing an example of a configuration of an aircraft including a morphing wing and a flight control device of a first embodiment.

FIG. 1 is a diagram showing an example of a configuration of an aircraft 100 including morphing wings 140 and a flight control device 200 of a first embodiment. The aircraft 100 imitates a bird and includes, for example, a propeller 110, a vertical stabilizer 120, a horizontal stabilizer 130, the morphing wings 140, and the flight control device 200.

In FIG. 1, $\Sigma_W$ denotes one set of Earth-fixed coordinates of an inertial coordinate system, $O_W$ denotes the origin of the Earth-fixed coordinates $\Sigma_W$, an $X_W$ axis represents true north, a $Y_W$ axis represents east, and a $Z_W$ axis represents a vertically downward direction. Also, if a principal inertia axis is defined as an airframe-fixed coordinate system, an $X_B$ axis in FIG. 1 represents the principal inertia axis of the airframe when the center of gravity of the aircraft 100 is the origin and a $Z_B$ axis represents a downward direction of the airframe. A $Y_B$ axis represents a right direction in a traveling direction of the airframe. In other words, the $X_B$ axis represents a roll axis, the $Z_B$ axis represents a yaw axis, and the $Y_B$ axis represents a pitch axis.

The propeller 110 is provided, for example, at the tip of the airframe of the aircraft 100, and is rotatably attached around the axis of the airframe (around the $X_B$ axis in FIG. 1).

The vertical stabilizer 120 and the horizontal stabilizer 130 are provided at positions away from the center of gravity of the airframe such as the end of the airframe of the aircraft 100.

The morphing wings 140 are provided on both the left and right sides of the airframe of the aircraft 100. The morphing wings 140 include a sweep mechanism, a twist mechanism, and a fold mechanism. The sweep mechanism is a mechanism for rotating the morphing wing 140 around the yaw axis $Z_B$. The twist mechanism is a mechanism for rotating the morphing wing 140 around the pitch axis $Y_B$. The fold mechanism is a mechanism for folding and deploying the morphing wing 140 with respect to the pitch axis $Y_B$ direction. In particular, the fold mechanism is also called a pantograph mechanism.

The flight control device 200 controls the propeller 110, the vertical stabilizer 120, the horizontal stabilizer 130, and the morphing wings 140 so that the aircraft 100 is allowed to take off, land, turn during flight, and descend while hovering.

Configuration of Morphing Wing

Figure 2:
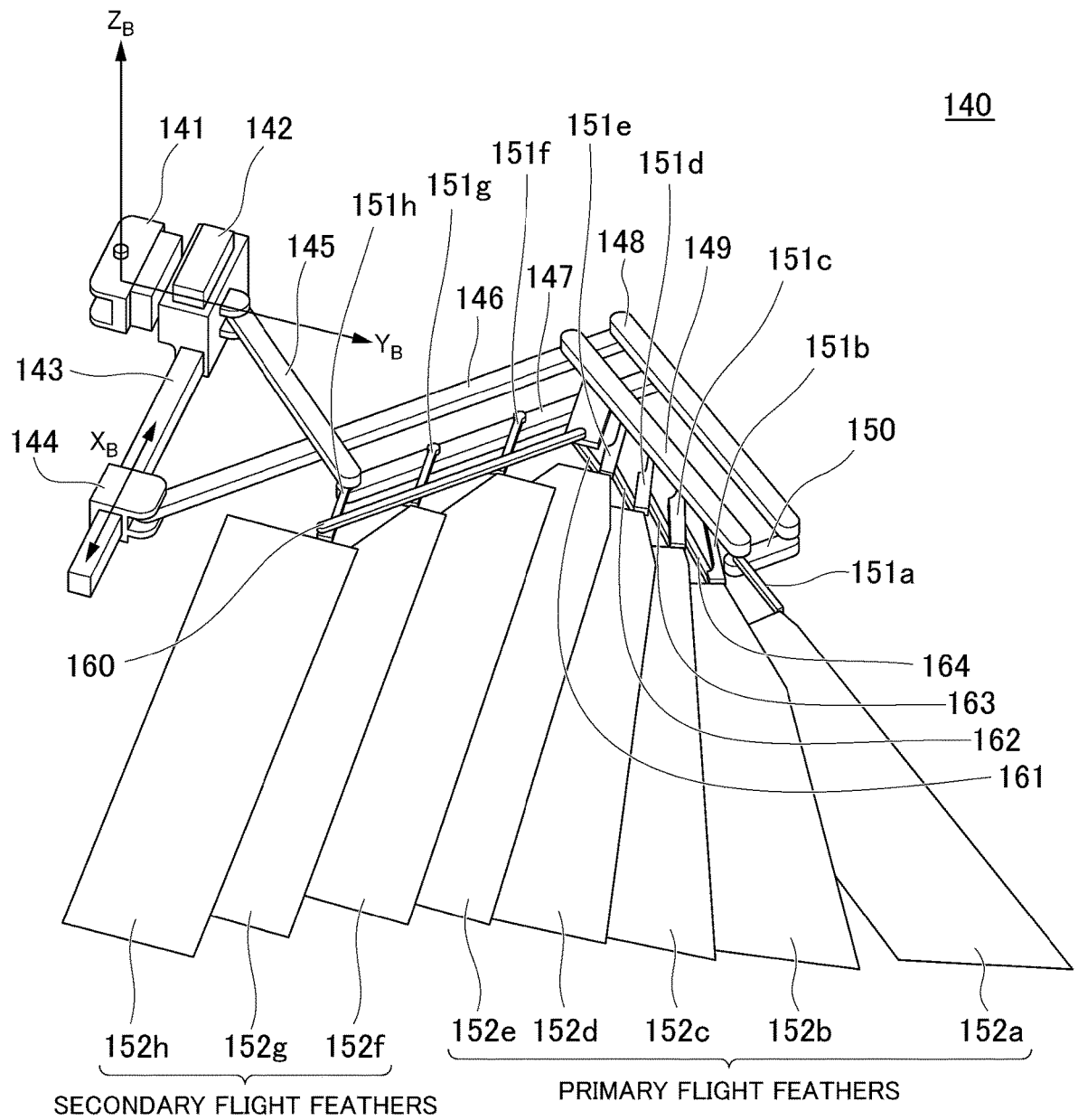
FIG. 2 is a diagram showing an example of a configuration of the morphing wing of the first embodiment.

Hereinafter, a configuration of the morphing wing 140 will be described. FIG. 2 is a diagram showing an example of the configuration of the morphing wing 140 of the first embodiment. The morphing wing 140 includes, for example, a yaw axis rotating member 141, a pitch axis rotating member 142, a rail member 143, a slider 144, fold members (skeleton member) 145 to 150, feather shafts 151a to 151h, flight feathers 152a to 152h, and link members 160 to 164. Hereinafter, when any one of the feather shafts 151a to 151h is not distinguished, these are collectively referred to as feather shafts 151. Also, when any one of the flight feathers 152a to 152h is not distinguished, these are collectively referred to as flight feathers 152. The above-described fold mechanism is a mechanism in which the rail member 143, the slider 144, and the fold members 145 to 150 are combined. The fold mechanism is also called a "link mechanism" because it is a mechanism that transmits a force or motion by combining several members. The link members 160 to 164 are examples of "connection members." One of the yaw axis rotating member 141 and the pitch axis rotating member 142 is an example of a "first rotating mechanism" and the other is an example of a "second rotating mechanism."

The yaw axis rotating member 141 and the pitch axis rotating member 142 connect the morphing wing 140 and the airframe of the aircraft 100 to each other. The yaw axis rotating member 141 rotates around the yaw axis $Z_B$. The pitch axis rotating member 142 rotates around the pitch axis $Y_B$.

The rail member 143 is attached to the airframe of the aircraft 100 via the yaw axis rotating member 141 and the pitch axis rotating member 142 so that a longitudinal direction thereof is substantially parallel to the roll axis $X_B$.

The slider 144 is attached to the rail member 143. The slider 144 slides on the rail member 143 in the longitudinal direction of the rail member 143, i.e., in the roll axis $X_B$ direction.

One end of the fold member 145 is attached to the pitch axis rotating member 142 so that the one end can rotate around the yaw axis $Z_B$. The other end of the fold member 145 is attached to the fold member 147 so that the other end can rotate around the yaw axis $Z_B$. The fold member 146 includes one end attached to the slider 144 so that the one end can rotate around the yaw axis $Z_B$ and the other end attached to the fold members 148 and 149 so that the fold member 146 intersects the fold member 145.

One end of the fold member 147 is attached to the fold member 145 and the other end thereof is attached to the fold members 148 and 149 so that the fold member 147 is substantially parallel to the fold member 146. One ends of both fold members 148 and 149 are attached to the fold member 146 and the other ends of both fold members 148 and 149 are attached to the fold member 150 so that the fold members 148 and 149 are parallel to each other.

The flight feathers 152a to 152h are, for example, members having a sheet shape (for example, a thickness of about several hundred micrometers [μm]) that allows a certain degree of deflection, such as carbon and glass fibers. A feather shaft 151 having a rigidity higher than or equal to that of carbon, a glass fiber, or the like is provided on each of the sheet-shaped flight feathers 152a to 152h.

For example, five flight feathers 152a to 152e among the flight feathers 152a to 152h are attached to the fold member 149. The remaining three flight feathers 152f to 152h among the flight feathers 152a to 152h are attached to the fold member 147. In the following description, the flight feathers 152a to 152e attached to the fold member 149 located on the outermore side of the morphing wing 140 will be referred to as "primary flight feathers" and the flight feathers 152f to 152h attached to the fold member 147 located on the innermore side of the morphing wing 140 will be referred to as "secondary flight feathers."

The number of flight feathers 152 is not limited to eight and may be seven or less or nine or more. Also, a secondary flight feather including a plurality of flight feathers 152 may be one flight feather 152. In this case, an area of the one flight feather 152 serving as the secondary flight feather is equal to or larger than a total area of the plurality of flight feathers 152.

The link member 160 connects the feather shafts 151f to 151h of the flight feathers 152f to 152h in the secondary flight feathers to each other. The link member 161 connects the feather shaft 151f of the flight feather 152f in the secondary flight feathers and the feather shaft 151e of the flight feather 152e in the primary flight feathers to each other. The link member 162 connects the feather shaft 151e of the flight feather 152e and the feather shaft 151d of the flight feather 152d to each other. The link member 163 connects the feather shaft 151d of the flight feather 152d and the feather shaft 151c of the flight feather 152c to each other. The link member 164 connects the feather shaft 151c of the flight feather 152c and the feather shaft 151b of the flight feather 152b to each other. Thereby, because each flight feather 152 is linked to another flight feather 152 adjacent thereto, the flight feathers 152 can overlap or extend in conjunction with the deploying of the morphing wing 140. As a result, it is possible to simulate a morphological mechanism of a bird in which adjacent feathers are connected to each other via small ligaments, muscles, and the like and these feathers are deployed in a conjunctional manner.

An attachment interval of the feather shaft 151 in the link member 160 may be, for example, longer than each of the link members 161 to 164. That is, a distance between the flight feathers 152 in the secondary flight feathers may be greater than a distance between the flight feathers 152 in the primary flight feathers. The attachment interval of the feather shafts 151 in the link member 160 may be the same as or shorter than an attachment interval of the feather shafts 151 in each of the link members 161 to 164.

The link member 162 may be longer than the link member 161, the link member 163 may be longer than the link member 162, and the link member 164 may be longer than the link member 163. Thereby, even in the same primary flight feathers, an angle between the flight feathers 152 on the outer side of the morphing wing 140 is larger and an angle between the flight feathers 152 on the inner side of the morphing wing 140 is smaller. In other words, even in the same primary flight feathers, a gap between the flight feathers 152 on the outer side of the morphing wing 140 is wider and a gap between the flight feathers 152 on the inner side of the morphing wing 140 is narrower. The angle formed here is an angle in an $X_B$-$Y_B$ plane and does not include an angle component with respect to the $Z_B$ axis.

Figure 3:
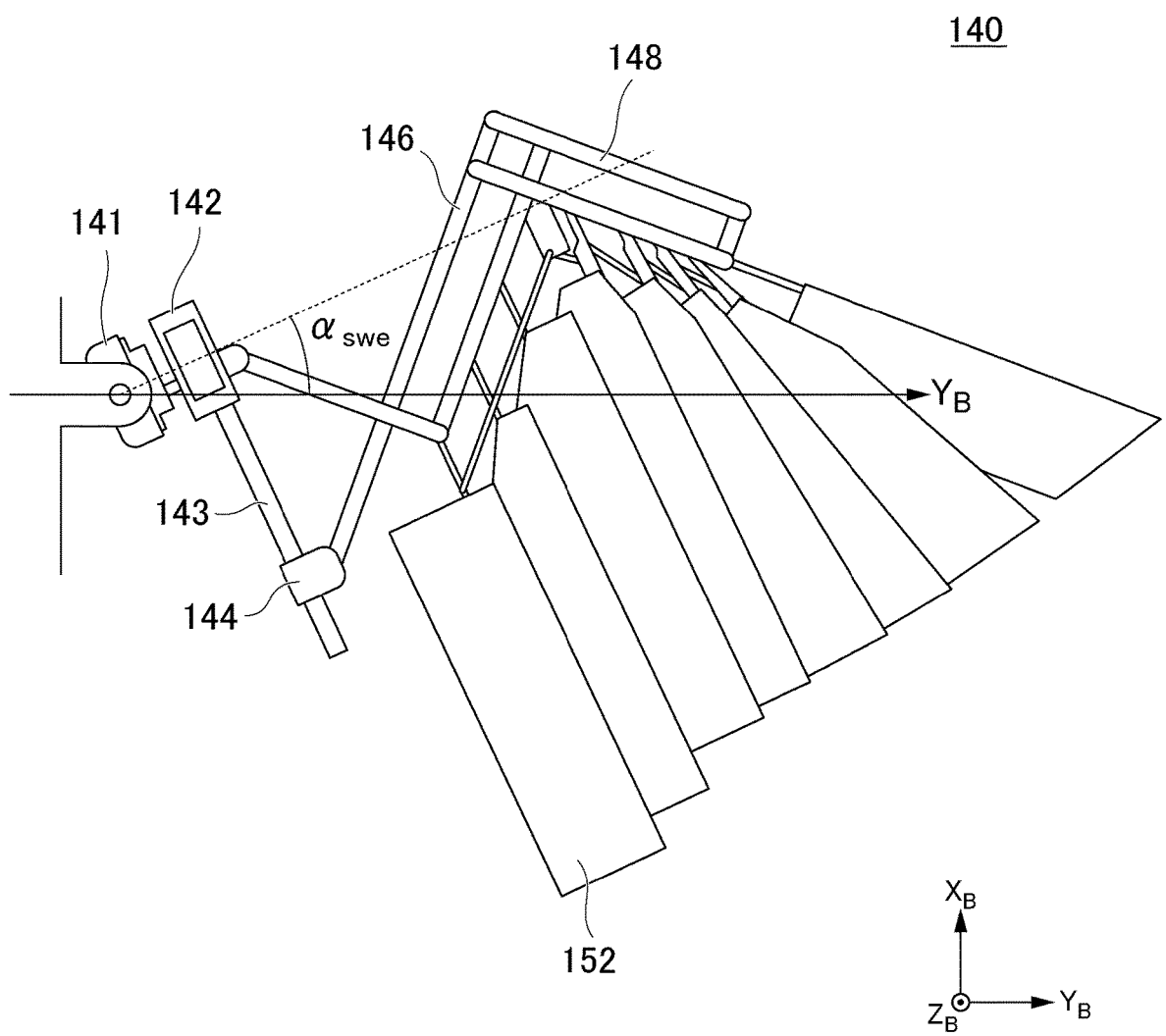
FIG. 3 is a diagram for describing a sweep operation of the morphing wing.

FIG. 3 is a diagram for describing a sweep operation of the morphing wing 140. The sweep operation is an operation in which the morphing wing 140 is rotated around the yaw axis $Z_B$ and the morphing wing 140 is moved back and forth in the aircraft 100. An angle formed by the pitch axis $Y_B$ when the morphing wing 140 is rotated around the yaw axis $Z_B$ is referred to as a "sweep angle $\alpha_{swc}$."

Figure 4:
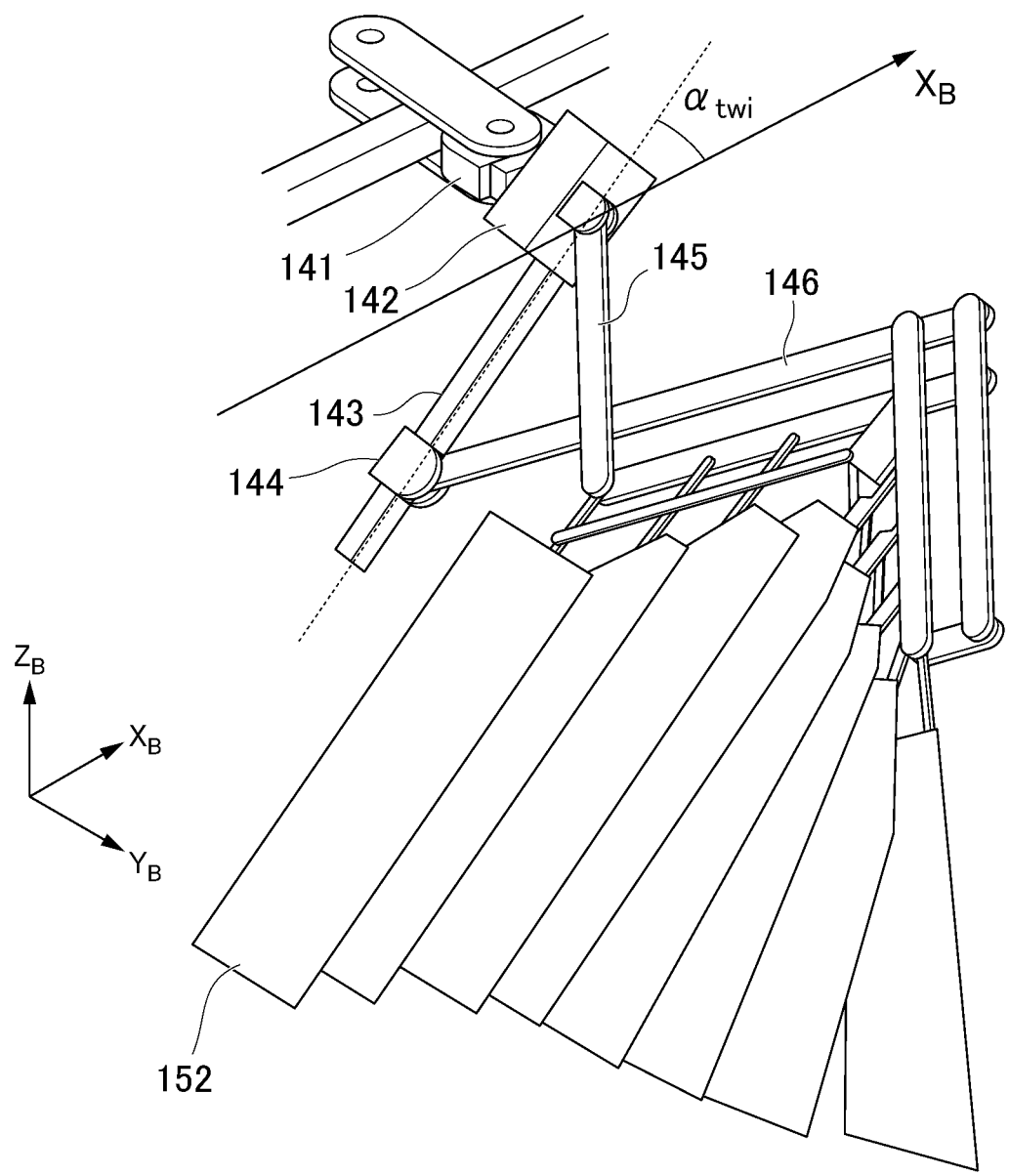
FIG. 4 is a diagram for describing a twist operation of the morphing wing.

FIG. 4 is a diagram for describing a twist operation of the morphing wing 140. The twist operation is an operation in which the morphing wing 140 is rotated around the pitch axis $Y_B$ and the morphing wing 140 is internally or externally turned with respect to the aircraft 100. An angle formed by the roll axis $X_B$ when the morphing wing 140 is rotated around the pitch axis $Y_B$ is referred to as a "twist angle $\alpha_{twi}$."

Figure 5:
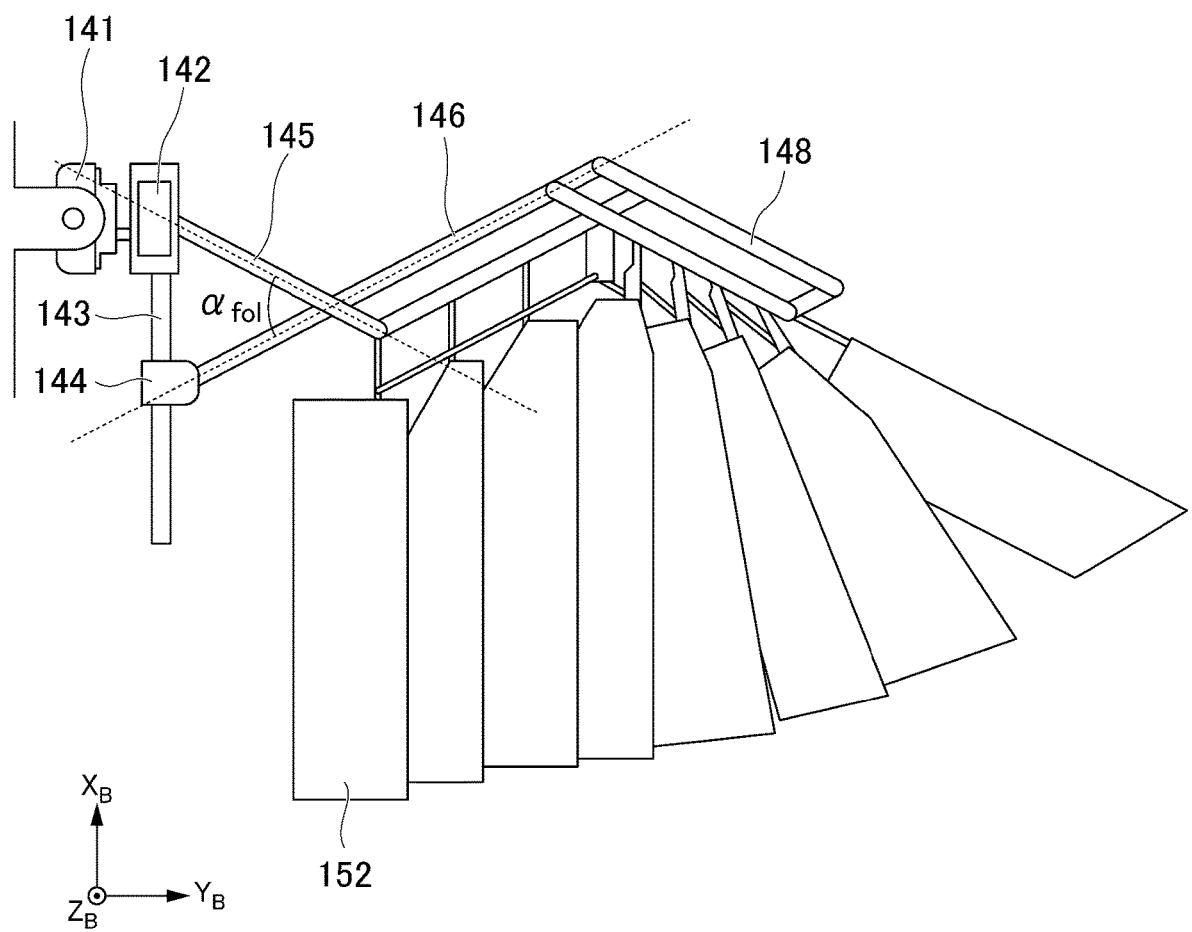
FIG. 5 is a diagram for describing a fold operation of the morphing wing.

FIG. 5 is a diagram for describing a fold operation of the morphing wing 140. The fold operation is an operation of extending the morphing wing 140 by extending the morphing wing 140 like a pantograph in the pitch axis $Y_B$ direction or folding the morphing wing 140 by contracting the morphing wing 140 like a pantograph in the pitch axis $Y_B$ direction. An angle formed by the fold members 145 and 146 when the morphing wing 140 is extended and contracted in the pitch axis $Y_B$ direction is referred to as a "fold angle $\alpha_{fol}$."

Figure 6:
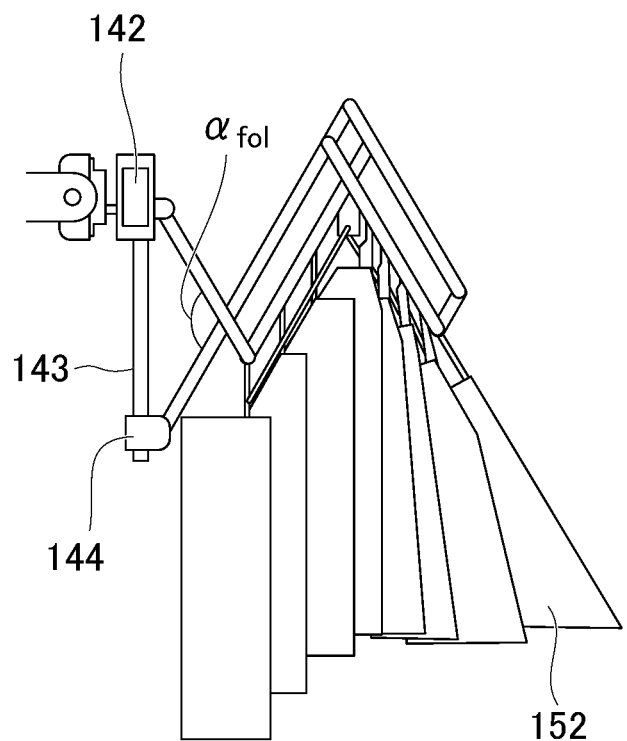
FIG. 6 is a diagram for describing a series of fold operations of the morphing wing.

FIGS. 6 to 9 are diagrams for describing a series of fold operations of the morphing wing 140. In the example of FIG. 6, the slider 144 is located at the end of the rail member 143 (the end opposite to a position where the pitch axis rotating member 142 is attached). In this case, the fold angle $\alpha_{fol}$ has a maximum angle within a possible angle range. Thereby, the morphing wing 140 is in a fully folded state.

Figure 7:
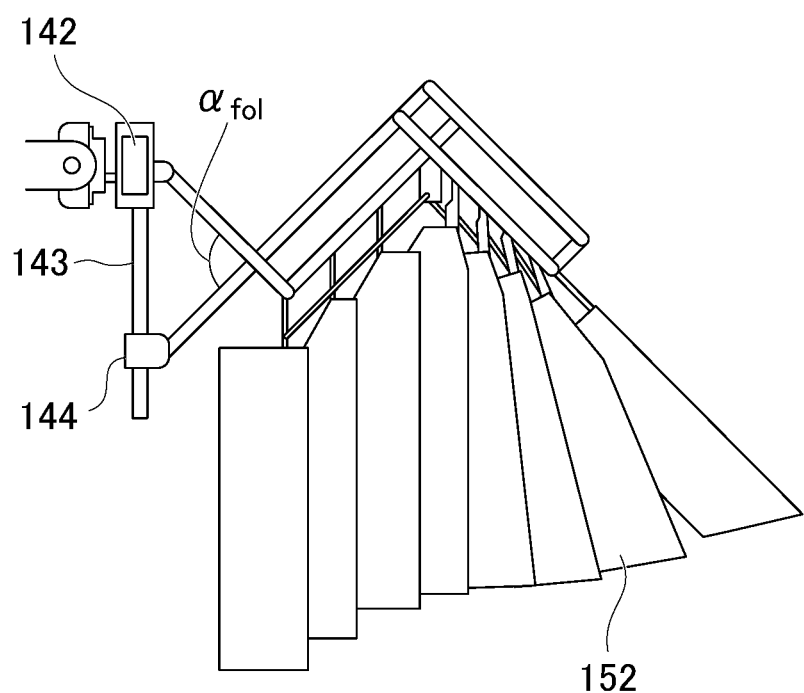
FIG. 7 is a diagram for describing a series of fold operations of the morphing wing.

In the example of FIG. 7, the slider 144 moves from the end of the rail member 143 to the end on the pitch axis rotating member 142 side. In this case, because the fold angle $\alpha_{fol}$ is smaller than an angle in an example shown in FIG. 6, the morphing wing 140 is more open than in a state in the example shown in FIG. 6.

Figure 8:
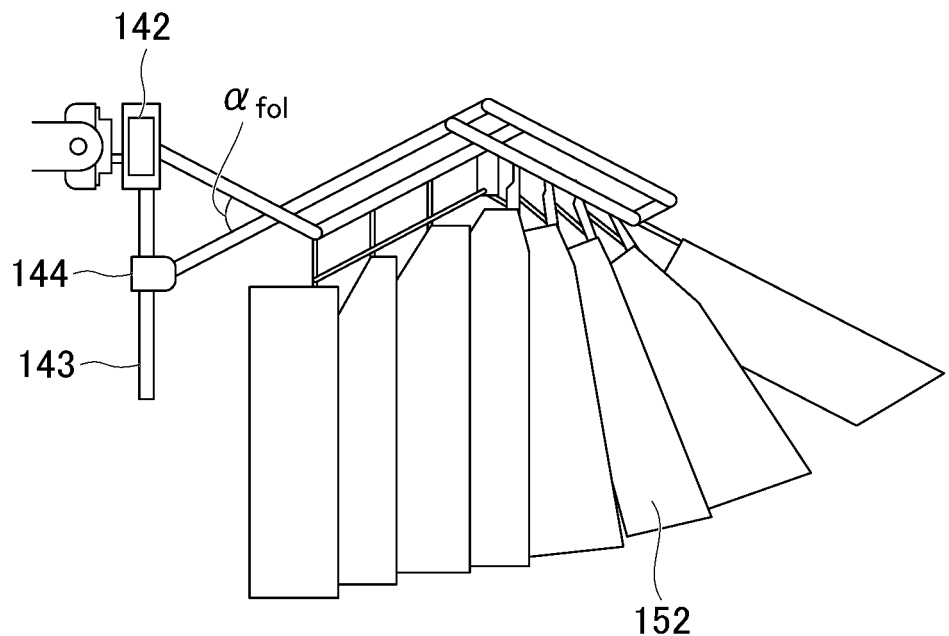
FIG. 8 is a diagram for describing a series of fold operations of the morphing wing.

In the example of FIG. 8, the slider 144 is further moved from its position in the example shown in FIG. 7 to the end on the pitch axis rotating member 142 side. In this case, because the fold angle $\alpha_{fol}$ is smaller than the angle in the example shown in FIG. 7, the morphing wing 140 is more open than in a state in the example shown in FIG. 7.

Figure 9:
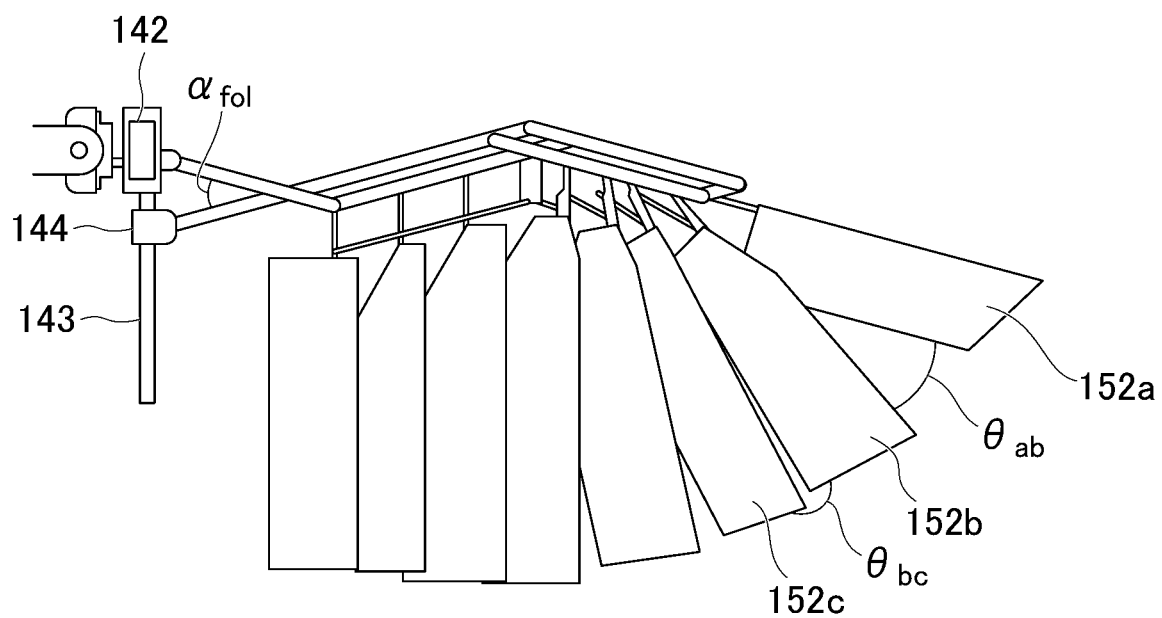
FIG. 9 is a diagram for describing a series of fold operations of the morphing wing.

In the example of FIG. 9, the slider 144 is moved to the end on the pitch axis rotating member 142 side as much as possible. In this case, the fold angle $\alpha_{fol}$ takes the smallest angle in the possible angle range. Thereby, the morphing wing 140 is fully opened.

In this way, the morphing wing 140 is folded or opened by moving the slider 144 on the rail member 143. Also, when the link member 160 attached to the flight feather 152 on the outer side of the morphing wing 140 becomes longer and the link member 164 attached to the flight feather 152 on the inner side of the morphing wing 140 is shorter, the fold angle $\alpha_{fol}$ becomes smaller. Thereby, when the morphing wing 140 has been opened, the flight feather 152 located on the outermore side of the morphing wing 140 is opened at a larger angle. As a result, a larger gap (a formed angle) is formed between the flight feathers 152 located on the outermore side of the morphing wing 140. For example, as in the example shown in FIG. 9, an angle θab between the flight feathers 152a and 152b is larger than an angle θbc between the flight feathers 152b and 152c and a gap (a formed angle) between the flight feathers 152a and 152b is larger than a gap (a formed angle) between the flight feathers 152b and 152c.

In general, it is known that, if the wing of the aircraft is unlikely to receive the wind (if the wind is weak) or if an angle of attack of the wing increases when the airframe lands, a phenomenon called boundary layer separation in which the airflow flowing on the surface of the wing is separated occurs and the aircraft stalls.

In the present embodiment, because a gap is formed between the flight feathers 152, it is possible to limit the occurrence of the boundary layer separation even if the morphing wing 140 is unlikely to receive the wind or even if the angle of attack of the morphing wing 140 increases. As a result, it is possible to make a stable flight while limiting a rapid decrease in a lift force. That is, because the airflow can be released into the gap even when the aircraft is flying at a large angle of attack by forming a gap between the flight feathers 152, a stall can be limited.

Configuration of Flight Control Device

Figure 10:
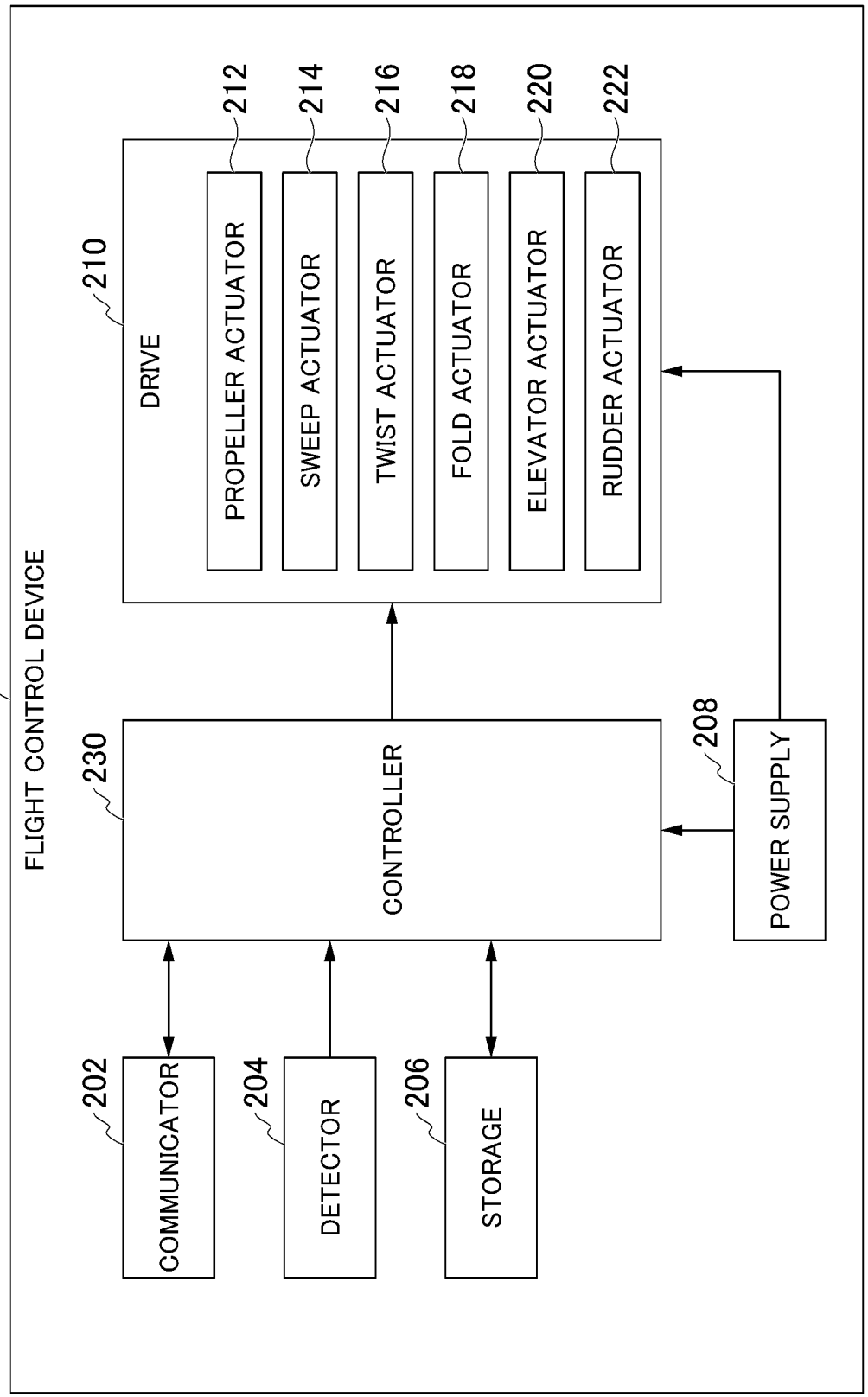
FIG. 10 is a diagram showing an example of a configuration of the flight control device of the first embodiment.

Hereinafter, a configuration of the flight control device 200 will be described. FIG. 10 is a diagram showing an example of the configuration of the flight control device 200 of the first embodiment. The flight control device 200 includes, for example, a communicator 202, a detector 204, a storage 206, a power supply 208, a drive 210, and a controller 230.

The communicator 202 performs wireless communication with an external device via a network such as a wide area network (WAN). The external device may be, for example, a remote controller capable of remotely controlling the aircraft 100. For example, the communicator 202 receives a command indicating the attitude and/or speed that the aircraft 100 should take and the like from an external device.

The detector 204 is, for example, an inertial measurement device. The inertial measurement device includes, for example, a triaxial accelerometer and a triaxial gyro sensor. The inertial measurement device outputs detected values detected by these sensors to the controller 230. The detected values from the inertial measurement device include, for example, accelerations and/or angular velocities in horizontal, vertical, and depth directions and speeds (rates) of pitch, roll, and yaw axes. The detector 204 may further include a radar device, a finder, a sonar, a global positioning system (GPS) receiver, and the like. Also, the detector 204 may further include an optical fiber sensor that detects the distortion of the vertical stabilizer 120, the horizontal stabilizer 130, and the morphing wing 140, and a pressure sensor that detects the pressure applied to these wings.

The storage 206 is implemented by, for example, a storage device such as a hard disc drive (HDD), a flash memory, an electrically erasable programmable read only memory (EEPROM), a read-only memory (ROM), or a random-access memory (RAM). In addition to various types of programs such as firmware and application programs, the storage 206 stores calculation results of the controller 230 and the like as a log.

The power supply 208 is a secondary battery such as a lithium-ion battery. The power supply 208 supplies electric power to the drive 210 and/or the controller 230. The power supply 208 may further include a solar panel or the like.

The drive 210 includes, for example, a propeller actuator 212, a sweep actuator 214, a twist actuator 216, a fold actuator 218, an elevator actuator 220, and a rudder actuator 222. These actuators may be, for example, servo motors.

The propeller actuator 212 drives the propeller 110 and gives thrust to the aircraft 100. The sweep actuator 214 drives the yaw axis rotating member 141 so that the morphing wing 140 is rotated around the yaw axis $Z_B$.

The twist actuator 216 drives the pitch axis rotating member 142 so that the morphing wing 140 is rotated around the pitch axis $Y_B$. The fold actuator 218 drives the slider 144 attached to the rail member 143 in the roll axis $X_B$ direction and deploys or folds the morphing wing 140 in the pitch axis $Y_B$ direction.

The elevator actuator 220 drives an elevator (not shown) provided on the horizontal stabilizer 130 and raises or lowers the nose of the aircraft. The rudder actuator 222 drives a rudder (not shown) provided on the vertical stabilizer 120 and controls yawing of the airframe.

The controller 230 is implemented, for example, by a processor such as a central processing unit (CPU) or a graphics processing unit (GPU) executing a program stored in the storage 206. Also, the controller 230 may be implemented by hardware such as a large-scale integration (LSI) circuit, an application-specific integrated circuit (ASIC), or a field-programmable gate array (FPGA) or may be implemented by software and hardware in cooperation.

Processing Content of Controller

Hereinafter, control content of the controller 230 will be described. The controller 230 causes the propeller 110 to be driven by controlling the propeller actuator 212 when the aircraft 100 is in a pitch-up state of 90 degrees. Thereby, the aircraft 100 takes off like a tail-sitter type vertical takeoff and landing (VTOL) unmanned aircraft. The tail-sitter method is a flight method in which the aircraft takes off from a pitch-up state of 90 degrees, returns the nose of the aircraft to a horizontal level at a certain altitude, and makes a flight with the lift force generated by the wings.

In such a tail-sitter method, because the attitude change is large, if the ZYX oiler is used to calculate an attitude error, the attitude becomes a peculiar attitude when the $Z_B$ axis is at ±90 degrees at the time of takeoff and landing and cannot be expressed. Also, in a flight that imitates a bird, there is a high probability that a large attitude change will occur, so that it is necessary to express the attitude without a peculiar attitude. To solve this problem, a quaternion is adopted to calculate an attitude error. The quaternion is expressed by Eq. (1) using a three-dimensional unit vector r and its rotation angle $\zeta$.

[Equation. 1]

$$q = \begin{bmatrix} \cos(\zeta/2) \\ r\sin(\zeta/2) \end{bmatrix} = [q_0 \ q_1 \ q_2 \ q_3]^T \quad (1)$$

If a target attitude is denoted by $q_r$ and a current attitude is denoted by $q_c$, deviation $q_e$ between the target attitude and the current attitude is expressed by Eq. (2) using a quaternion matrix.

[Equation. 2]

$$q_e = \begin{bmatrix} q_{ro} & q_{r1} & q_{r2} & q_{r3} \\ -q_{r1} & q_{ro} & q_{r3} & -q_{r2} \\ -q_{r2} & -q_{r3} & q_{ro} & q_{r1} \\ -q_{r3} & q_{r2} & -q_{r1} & q_{ro} \end{bmatrix} q_c \quad (2)$$

The deviation $q_e$ indicates how much rotation is required to be made around which axis in the current airframe-fixed coordinate system of the aircraft so that the current attitude of the airframe is approximated to the target attitude. For example, the controller 230 performs feedback control by associating a vector unit $q_{ex, ey, ez}$ of $q_e$ with the $X_B$, $Y_B$, and $Z_B$ axes of the airframe-fixed coordinates.

Figure 11:
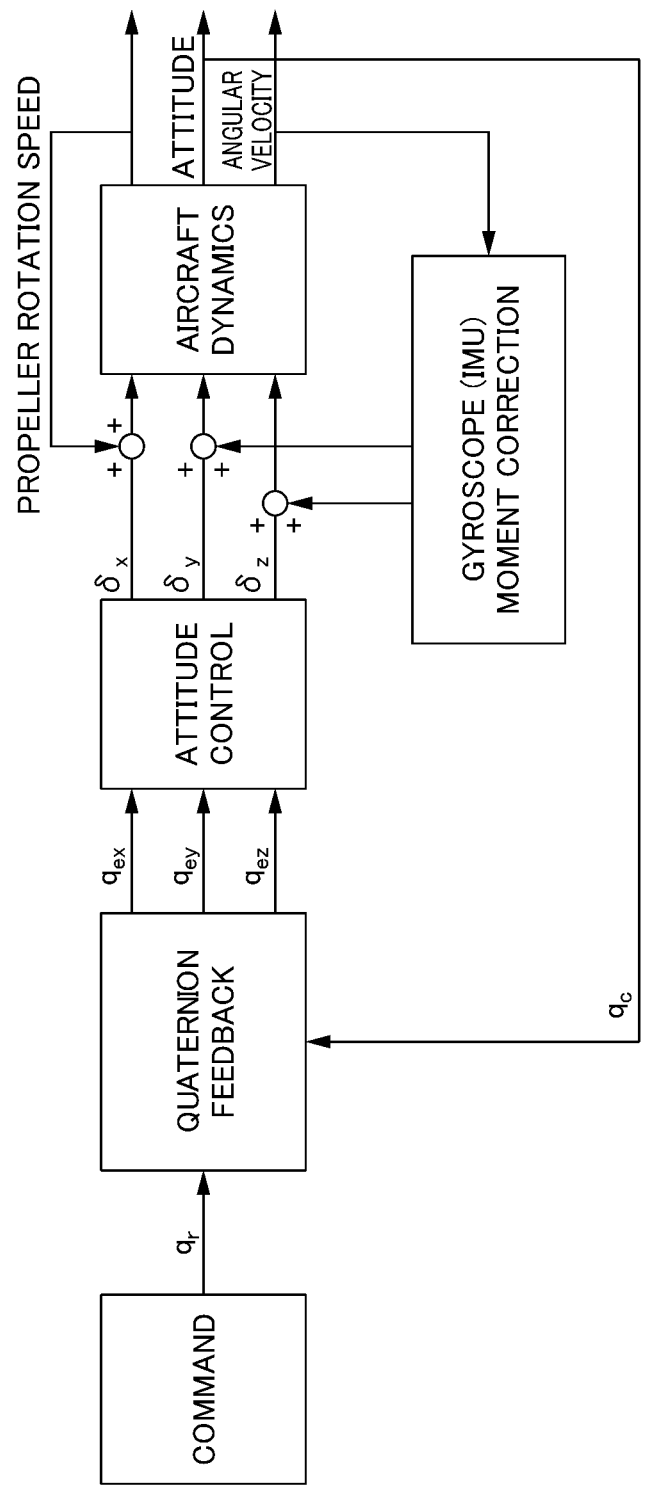
FIG. 11 is a diagram showing an example of an attitude control system using quaternion feedback.

FIG. 11 is a diagram showing an example of an attitude control system using quaternion feedback. For example, the controller 230 controls the twist actuator 216 so that the attitude of the aircraft 100 with respect to the $X_B$ axis is controlled. Also, the controller 230 controls the elevator actuator 220 so that the attitude of the aircraft 100 with respect to the $Z_B$ axis is controlled. Also, the controller 230 controls the rudder actuator 222 so that the attitude of the aircraft 100 with respect to the $Y_B$ axis is controlled.

The controller 230 performs proportional-integral-differential (PID) control on the actuator corresponding to each axis. The PID control is represented by Eqs. (3) to (5).

[Equation. 3]

$$\delta_x = -(K_P q_{ex} + K_I \int q_{ex} dt + K_D \dot{q}_{ex}) \quad (3)$$

[Equation. 4]

$$\delta_y = -(K_P q_{ey} + K_D \dot{q}_{ey}) + K_j \omega_z \quad (4)$$

[Equation. 5]

$$\delta_z = -(K_P q_{ez} + K_D \dot{q}_{ez}) + K_j \omega_y \quad (5)$$

In the equations, $δ_x$ denotes a twist steering angle, i.e., a twist angle $α_{twt}$, $δ_y$ denotes an elevator steering angle, and $δ_z$ denotes a rudder steering angle. $K_P$ denotes a proportional gain, $K_I$ denotes an integral gain, and $K_D$ denotes a differential gain. $K_J$ denotes a gain for correcting the gyro moment of the airframe.

For the control of the $Y_B$ axis and the $Z_B$ axis, a correction term considering an influence of the propeller gyro effect is added to the third term on the right side. $ω_x$ is small enough to ignore because the airframe rarely rotates at a high speed around the $X_B$ axis.

For example, as shown in FIG. 11, the controller 230 calculates the target attitude using an error distance between a current position of the aircraft 100 and a target position. The controller 230 controls the twist actuator 216, the elevator actuator 220, and the rudder actuator 222 on the basis of the calculated target attitude to control the attitude of the aircraft 100. The target attitude may be indicated by an external device as a command.

Processing Flow of Controller

Figure 12:
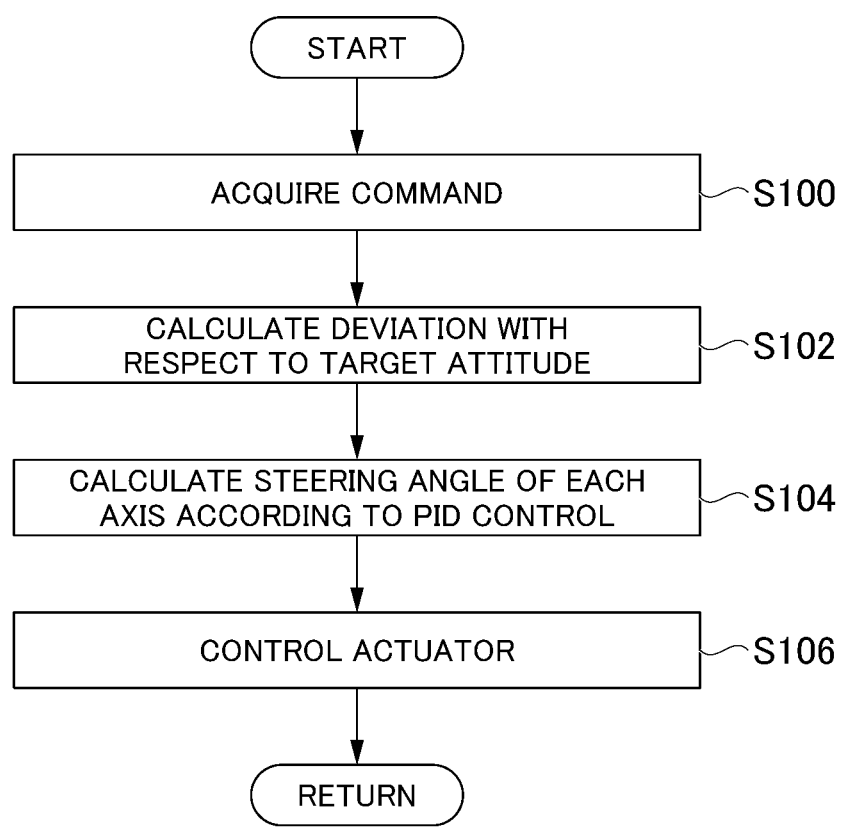
FIG. 12 is a flowchart showing a flow of a series of processing steps of a controller.

Hereinafter, a flow of a series of processing steps of the controller 230 will be described using a flowchart. FIG. 12 is a flowchart showing a flow of a series of processing steps of the controller 230. The process of the present flowchart may be iterated, for example, at a prescribed interval.

First, the controller 230 acquires a command from an external device via the communicator 202 (step S100). The command includes, for example, an attitude to be taken by the aircraft 100, i.e., a target attitude $q_r$.

Subsequently, the controller 230 calculates a current attitude $q_c$ of the aircraft 100 on the basis of a detection result of the detector 204 and calculates deviation $q_e$ between the calculated current attitude $q_c$ and the target attitude $q_r$ (step S102). The deviation $q_e$ includes a quaternion $q_{ex, ey, ez}$ corresponding to the $X_B$, $Y_B$, and $Z_B$ axes of the airframe-fixed coordinates.

Subsequently, the controller 230 performs calculations according to PID control using the twist steering angle $δ_x$, the elevator steering angle $δ_y$, and the rudder steering angle $δ_z$ as control quantities on the basis of the calculated deviation $q_e$ (step S104).

Subsequently, the controller 230 sends a control signal based on the calculated steering angles $δ_x$, $δ_y$, and $δ_z$ to each actuator and controls each actuator (step S106). Thereby, the process of the present flowchart ends.

Figure 13:
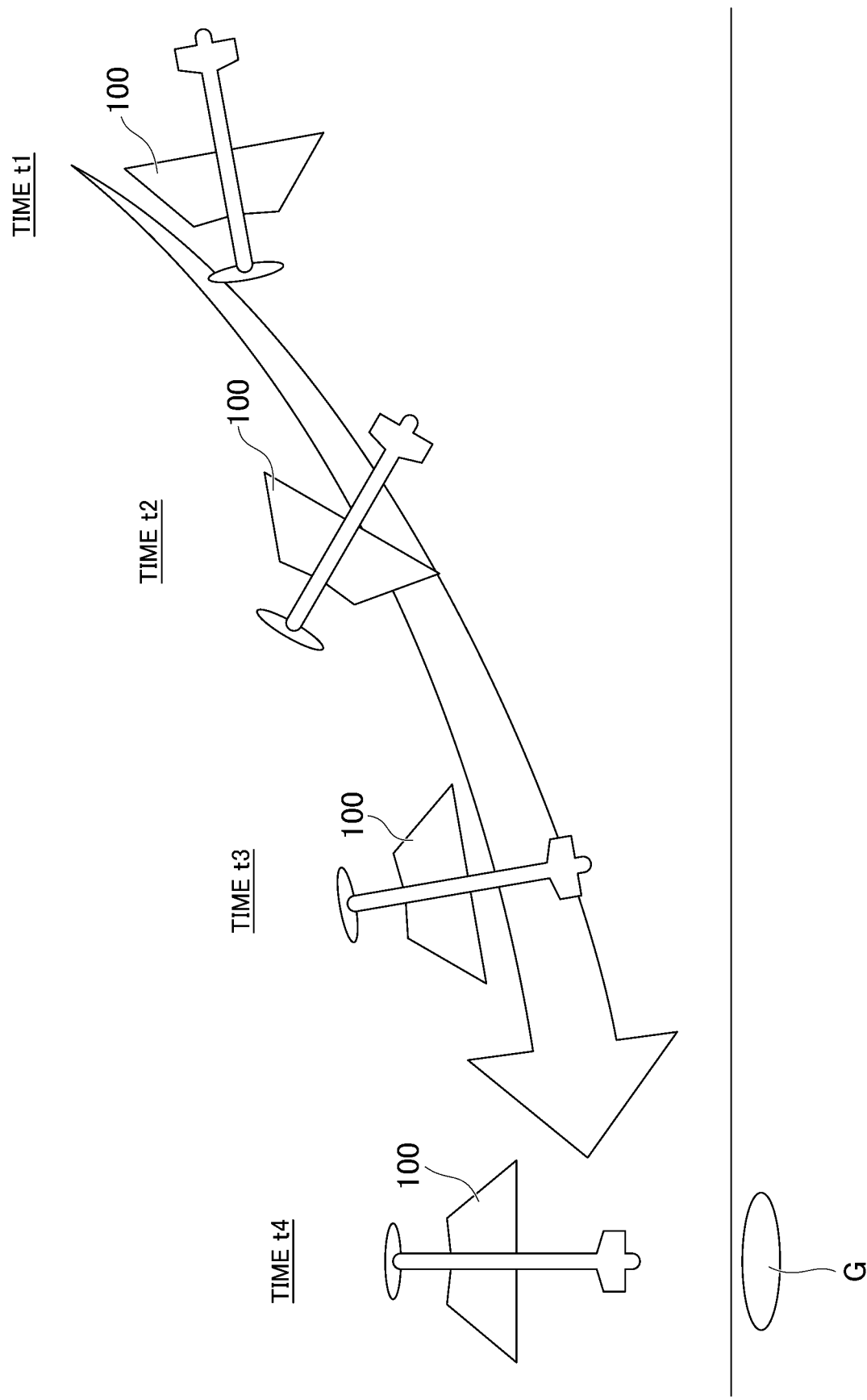
FIG. 13 is a diagram schematically showing a flight state of the aircraft.

FIG. 13 is a diagram schematically showing a flight state of the aircraft 100. In an example shown in FIG. 13, a state when the aircraft 100 flying horizontally at a certain altitude is landing is shown. In FIG. 13, G is a target landing point. The landing point G may be a one-dimensional point, a two-dimensional surface, or a three-dimensional space.

For example, it is assumed that the communicator 202 receives a command for landing the aircraft 100 from an external device at time t1. In this case, the controller 230 controls the sweep actuator 214 so that the morphing wing 140 is rotated around the yaw axis $Z_B$, thereby moving the morphing wing 140 to the front of the airframe. Thereby, the nose of the aircraft 100 is raised. Also, the controller 230 controls the fold actuator 218 so that the morphing wing 140 is further extended in the pitch axis $Y_B$ direction, an angle formed between the flight feathers 152 increases, and a gap is formed. Also, the controller 230 controls the elevator actuator 220 so that the nose of the aircraft 100 is raised. Thereby, the aircraft 100 transitions to a 90-degree pitch-up state while the airframe is lifted at times t2, t3, and t4. As a result, the aircraft 100 can quickly decelerate because a drag force of the entire airframe becomes large. Also, because a gap is formed between the flight feathers 152 during deceleration, a stall can be limited. When the aircraft 100 is in the pitch-up state, the controller 230 controls the propeller actuator 212 so that the aircraft 100 is allowed to hover and lowered to the landing point G.

According to the first embodiment described above, an angle between the flight feathers 152 of the morphing wing 140 increases in accordance with the extension of the morphing wing 140 in the pitch axis $Y_B$ direction. Thereby, a gap is formed between the flight feathers 152, so that the airflow can be released into the gap and a stall can be limited. As a result, the flight performance of the aircraft 100 can be improved.

Also, according to the first embodiment described above, in addition to the fold mechanism that extends and contracts the morphing wing 140 in the pitch axis $Y_B$ direction, the morphing wing 140 further includes a sweep mechanism that causes the morphing wing 140 to rotate around the yaw axis $Z_B$ and causes the morphing wing 140 to move in a front-rear direction of the airframe and a twist mechanism that causes the morphing wing 140 to rotate around the pitch axis $Y_B$ and causes the morphing wing 140 to internally or externally turn with respect to the aircraft 100, thereby increasing an amount of change in a wing area or a shape of the morphing wing 140. As a result, changes in the lift force and moment become large and the agility of the aircraft 100 can be improved.

The above-mentioned morphing wing 140 can perform each of the sweep operation, the twist operation, and the fold operation so that both wings are symmetrical or asymmetrical. Also, the morphing wing 140 can be applied not only to a flight structure but also to a wind power or tidal current power generation plaid and other structures to which a force is applied from a fluid.

Second Embodiment

Hereinafter, a second embodiment will be described. The second embodiment is different from the above-described first embodiment in that a control quantity of each of a sweep mechanism, a twist mechanism, and a fold mechanism is determined on the basis of an attitude and/or a speed of the aircraft 100 and the like using deep reinforcement learning. Hereinafter, the second embodiment will be mainly described with respect to differences from the first embodiment and description of similarities between the first embodiment and the second embodiment will be omitted. In the description of the second embodiment, parts that are the same as those of the first embodiment will be described with the same reference signs.

Deep reinforcement learning includes, for example, a deep Q-network (DQN). The DQN is related to a technique of causing a neural network to learn an action value function $Q(s_t, a_t)$ in which a value when a certain action $a_t$ is selected under a certain environmental state $s_t$ at a certain time t is expressed as a function in reinforcement learning called Q-learning as an approximation function.

Figure 14:
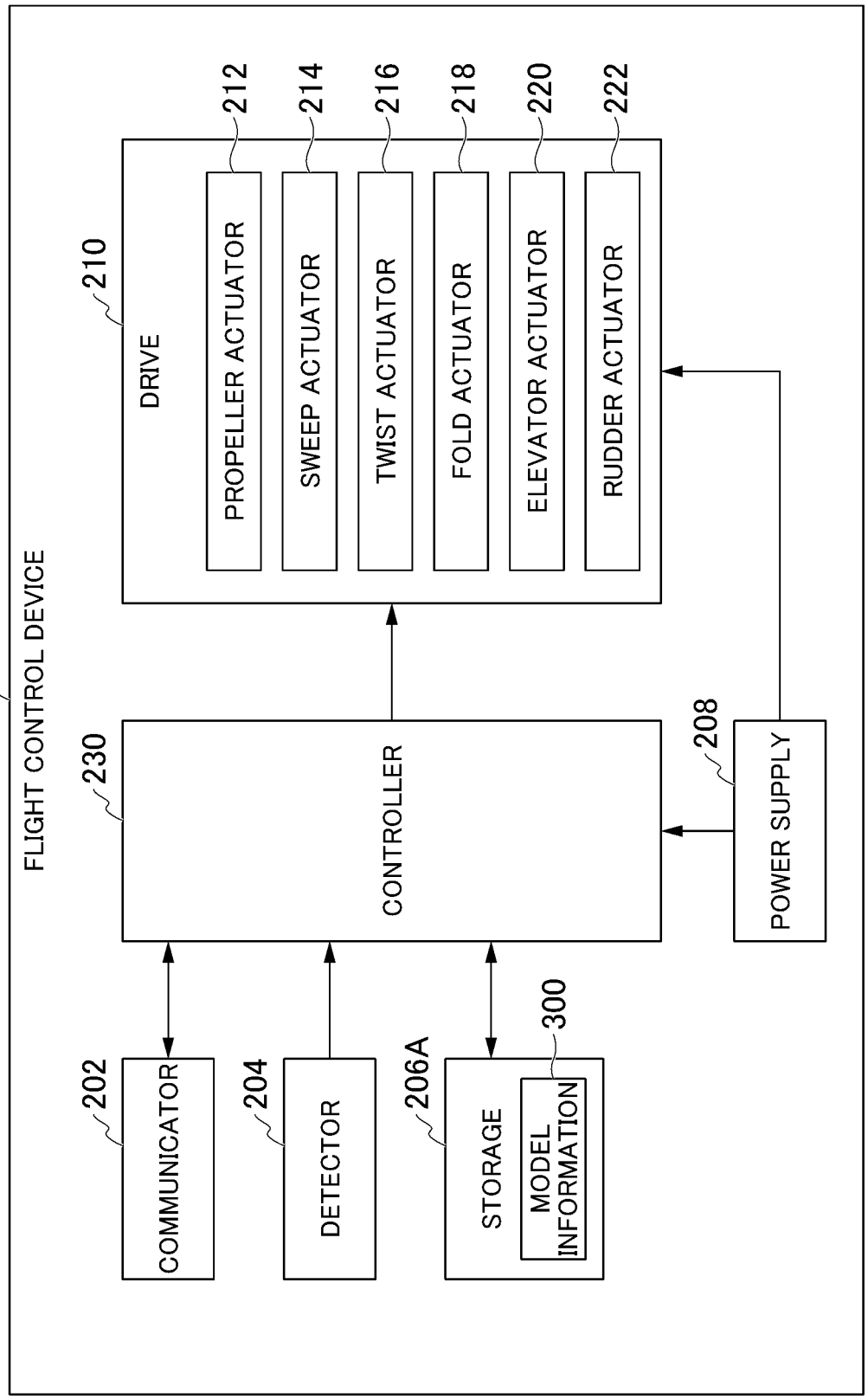
FIG. 14 is a diagram showing an example of a configuration of a flight control device of a second embodiment.

FIG. 14 is a diagram showing an example of a configuration of a flight control device 200A of the second embodiment. In the flight control device 200A of the second embodiment, model information 300 is stored in a storage 206A.

The model information 300 is information (a program or data structure) that defines a model MDL trained by Q-learning. The model MDL may be implemented, for example, by a neural network including a plurality of convolution layers and a fully-connected layer that integrates output results of the plurality of convolution layers into a single result.

The model information 300 includes, for example, connection information about how units included in an input layer, one or more hidden layers (intermediate layers), and an output layer constituting each neural network are connected to each other and various types of information such as connection coefficients given to data input/output between the connected units. The connection information includes, for example, information such as the number of units included in each layer, information for designating a type of unit to which each unit is connected, an activation function for implementing each unit, and a gate provided between the units in the hidden layer. The activation function for implementing the unit may be, for example, a rectified linear function (ReLU function), a sigmoid function, a step function, or another function. The gate selectively passes or weights data transmitted between the units, for example, in accordance with the value returned by the activation function (for example, 1 or 0). The connection coefficient includes, for example, a weight given to output data when data is output from a unit of a certain layer to a unit of a deeper layer in a hidden layer of a neural network. Also, the connection coefficient may include a bias component peculiar to each layer.

The model MDL is trained to output the action value $Q(s_t, a_t)$, for example, when a state variable $s_t$ is input.

The state variable $s_t$ is, for example, a current attitude $q_c$ or a target attitude $q_r$ of the above-mentioned aircraft 100, or deviation $q_e$ therebetween. Also, the state variable $s_t$ may include a speed of the aircraft 100 or the like instead of or in addition to the attitude and deviation. Also, when the detector 204 includes an optical fiber sensor for detecting distortion and a pressure sensor for detecting pressure, the state variable $s_t$ may include distortion and pressure that can be acquired from these sensors. The state variable $s_t$ including distortion and pressure is an example of "displacement information."

The action $a_t$ is, for example, a control quantity of the sweep mechanism, a control quantity of the twist mechanism, a control quantity of the fold mechanism, a rotation speed of the propeller 110, a steering angle of the elevator, a steering angle of the rudder, or the like. That is, the action $a_t$ is an operation quantity of each actuator of the drive 210. The action $a_t$ may be a proportional gain $K_P$ of PID control, an integral gain $K_I$, a differential gain $K_D$, or a correction gain $K_J$. The action $a_t$ may be an index value indicating which of various types of control such as PID control and hovering control is to be controlled or not.

In Q-learning, for example, when the morphing wing 140, the propeller 110, the elevator, and the rudder take an ideal state, the reward is increased and the weight and bias of the model MDL are learned. For example, when the attitude of the aircraft 100 is a pitch-up attitude of 90 degrees and the speed of the aircraft 100 is at a speed that can be regarded as stationary in the sky above the determined landing point G, the reward may be increased. On the other hand, when the aircraft 100 is in contact with the ground or trees or deviates from a determined altitude, the reward may be decreased (for example, zero).

The controller 230 inputs the current attitude $q_c$ and the target attitude $q_r$ of the aircraft 100 as the state variables $s_t$ to the model MDL that has been trained so that the reward is given in accordance with the action $a_t$ in this way. The model MDL to which these state variables $s_t$ are input outputs an operation quantity of each actuator whose reward is likely to be the highest as the action value $Q(s_t, a_t)$.

The controller 230 causes the aircraft 100 to make a flight by controlling the actuator on the basis of the operation quantity of each actuator output by the model MDL.

According to the above-described second embodiment, because each actuator is controlled using the model MDL trained in advance by Q-learning, the flight method of the aircraft can be approximated to the flight method of the bird. As a result, the agility of the aircraft 100 can be further improved.

Also, according to the above-described second embodiment, because it is possible to cause the model MDL to be trained so that a relationship between the input and the motion serving as the response to the input has significant non-linearity but an appropriate action can be output under a non-linear environment in the flight operation by the sweep mechanism, the twist mechanism, and the fold mechanism, it is possible to adopt a flight method that was difficult in conventional control.

Other Embodiments (Modified Examples)

Hereinafter, other embodiments (modified examples) will be described. Although the aircraft 100 including the propeller 110, the vertical stabilizer 120, the horizontal stabilizer 130, the morphing wing 140, and the flight control device 200 has been described in the above-described embodiment, the embodiment is not limited to such a case. For example, the aircraft 100 may include only the propeller 110, the morphing wing 140, and the flight control device 200. In this case, the flight control device 200 may drive the twist mechanism so that the attitude of the roll axis $X_B$ of the aircraft 100 is controlled or drive the sweep mechanism so that the attitude of the pitch axis $Y_B$ of the aircraft 100 is controlled.

Although the case where the morphing wing 140 includes the yaw axis rotating member 141, the pitch axis rotating member 142, the rail member 143, the slider 144, the fold members 145 to 150, the feather shafts 151a to 151h, the flight feathers 152a to 152h, and the link members 160 to 164 has been described in the above-described embodiment, the embodiment is not limited to such a case. For example, some of the fold members 145 to 150 may be omitted from the morphing wing 140.

Figure 15:
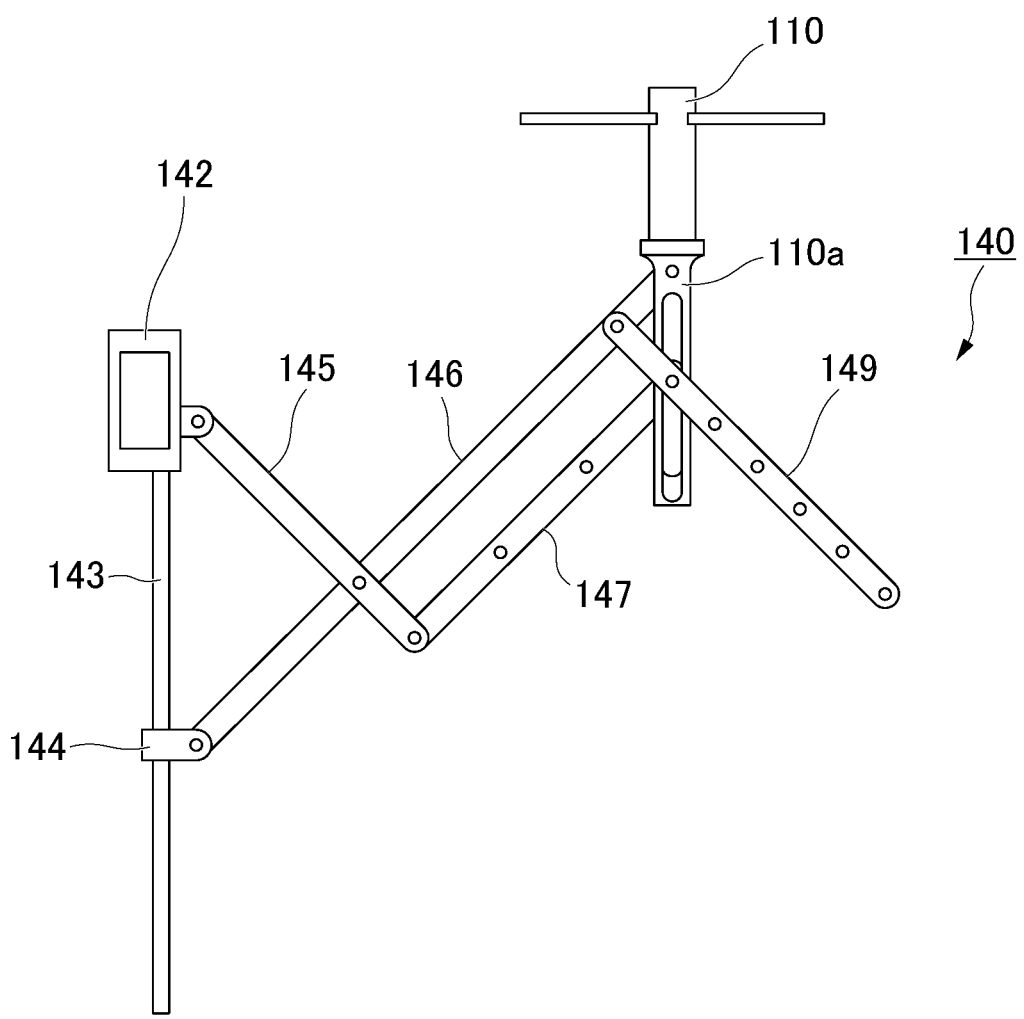
FIG. 15 is a diagram showing an example of a configuration of a morphing wing of another embodiment.

FIG. 15 is a diagram showing an example of a configuration of the morphing wing 140 of another embodiment. As shown in the example of FIG. 15, the fold members 148 and 150 may be omitted from the morphing wing 140. Also, a fold member 146 of the morphing wing 140 may be newly provided with a base 110a. A propeller 110 is rotatably attached to the base 110a. As a result, one propeller 110 is provided on each wing.

Although the case where the number of flight feathers 152 in the primary flight feathers is greater than the number of flight feathers 152 in the secondary flight feathers of the morphing wing 140 has been described in the above-described embodiment, the embodiment is not limited to such a case. The number of flight feathers 152 in the secondary flight feathers may be greater than the number of flight feathers 152 in the primary flight feathers. When the number of flight feathers 152 in the secondary flight feathers is greater than the number of flight feathers 152 in the primary flight feathers, an attachment interval of the feather shafts 151 of the flight feathers 152 in the secondary flight feathers may be less than an attachment interval of the feather shafts 151 of the flight feathers 152 in the primary flight feathers.

Although the case where the flight feathers 152f to 152h in the secondary flight feathers are connected to each other via one link member 160 has been described in the above-described embodiment, the embodiment is not limited to such a case. For example, the flight feathers 152f and 152g in the secondary flight feathers may be connected to each other via a link member 160-1 and the flight feathers 152g and 152f may be connected to each other via a link member 160-2 which is longer than the link member 160-1. In this way, like the flight feathers 152 in the primary flight feathers, the flight feathers 152 in the secondary flight feathers may also be connected to each other via a plurality of link members. In this case, the flight feathers 152 in the secondary flight feathers are in conjunction with the deploying of the morphing wings 140 and an angle formed between the flight feathers 152 increases toward an airframe side in an inward direction.

Although modes for carrying out the present invention have been described using embodiments, the present invention is not limited to the embodiments and various modifications and substitutions can also be made without departing from the scope and spirit of the present invention.

REFERENCE SIGNS LIST

100 Aircraft
110 Propeller
120 Vertical stabilizer
130 Horizontal stabilizer
140 Morphing wing
141 Yaw axis rotating member
142 Pitch axis rotating member
143 Rail member
144 Slider
145 to 150 Fold member
151 Feather shaft
152 Flight feather
160 to 164 Link member
200 Flight control device
202 Communicator
204 Detector
206 Storage
208 Power supply
210 Drive
230 Controller

What is claimed is:

1. A morphing wing comprising:
a pantograph mechanism capable of being extended and contracted in a predetermined direction;
a plurality of flight feathers attached to the pantograph mechanism;
connection members configured to connect flight feathers adjacent to each other among the plurality of flight feathers;
a first rotating mechanism configured to rotate the pantograph mechanism around one axis of a plane that intersects the direction; and
a second rotating mechanism configured to rotate the pantograph mechanism around another axis of the plane,
wherein each of the plurality of flight feathers is configured so that an angle formed by adjacent flight feathers connected via the connection members increases as the pantograph mechanism extends.

2. The morphing wing according to claim 1, wherein an angle formed by the adjacent flight feathers connected via the connection members is larger when the flight feathers among the plurality of flight feathers are located more outward in the wing.

3. The morphing wing according to claim 1,
wherein the connection members include:
a first connection member configured to mutually connect a first flight feather and a second flight feather adjacent to the first flight feather and located more inward than the first flight feather in the wing among the plurality of flight feathers; and
a second connection member configured to mutually connect the second flight feather and a third flight feather adjacent to the second flight feather and located more inward than the second flight feather in the wing among the plurality of flight feathers, and
wherein the first connection member is longer than the second connection member.

4. A flight control device for controlling an aircraft including the morphing wing according to claim 1, the flight control device comprising:
a drive configured to extend and contract the pantograph mechanism in the direction; and
a controller configured to control the drive,
wherein, when the aircraft lands, the controller controls the drive so that the pantograph mechanism is extended in the direction and an angle formed by the flight feathers among the plurality of flight feathers is increased.

5. The flight control device according to claim 4, wherein the controller acquires attitude information indicating an attitude of the aircraft and controls the drive on the basis of an output result of a model obtained by inputting the acquired attitude information to the model trained using deep reinforcement learning.

6. The flight control device according to claim 5, wherein the controller further acquires displacement information including at least one of distortion and pressure of the morphing wing and controls the drive on the basis of an output result of the model obtained by inputting the acquired displacement information to the model.

7. A flight control method comprising:
controlling, by a flight control device for controlling an aircraft including the morphing wing according to claim 1, a drive configured to extend and contract the pantograph mechanism in the direction so that the pantograph mechanism is extended in the direction and an angle formed by the flight feathers among the plurality of flight feathers is increased when the aircraft lands.

8. A non-transitory computer-readable storage medium storing a program for causing a flight control device for controlling an aircraft including the morphing wing according to claim 1 to execute operations, the operations comprising:
controlling a drive configured to extend and contract the pantograph mechanism in the direction so that the pantograph mechanism is extended in the direction and an angle formed by the flight feathers among the plurality of flight feathers is increased when the aircraft lands.

* * * * *